Figure 1:
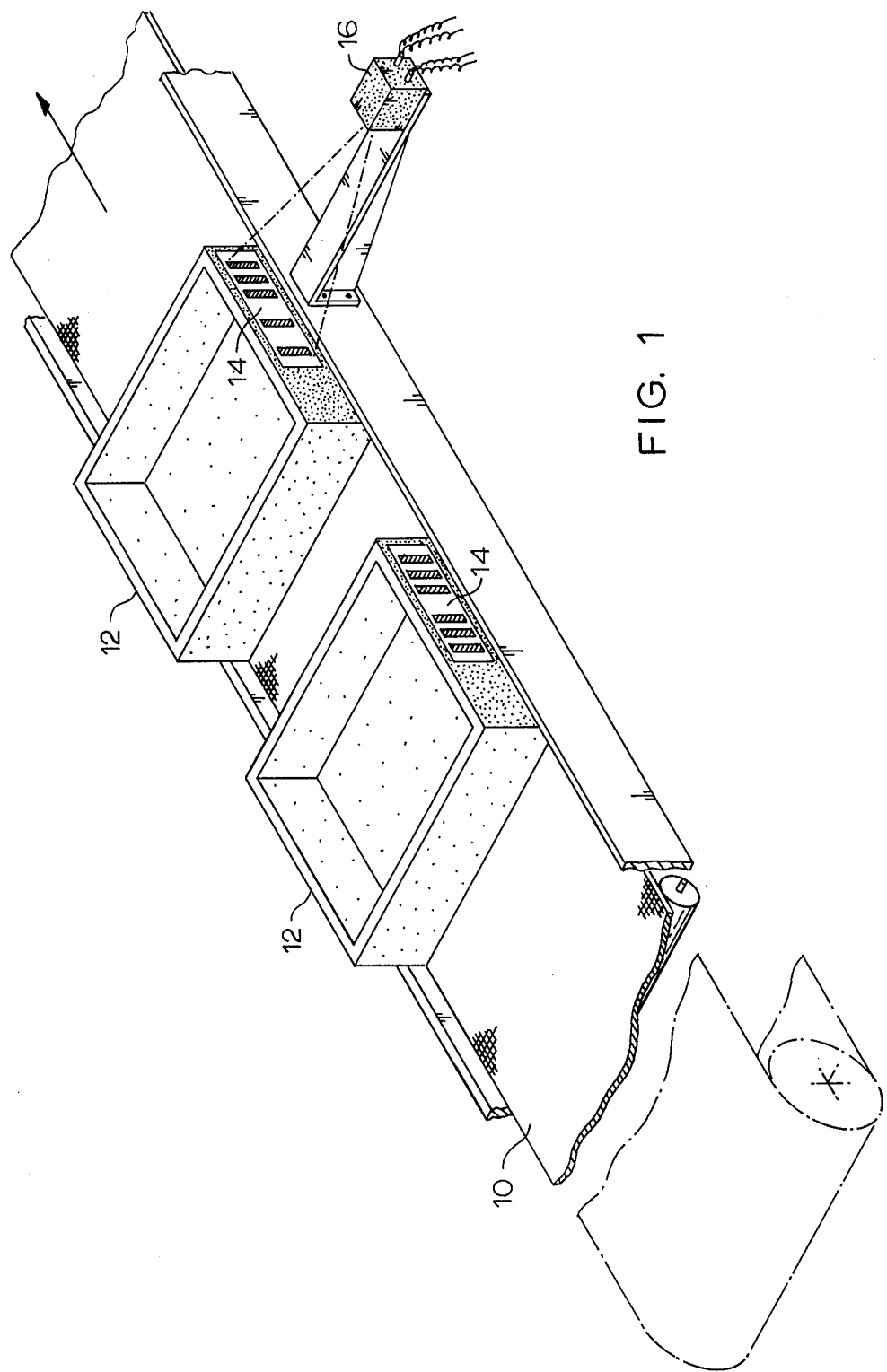

United States Patent [19]

Cass

[11] 4,025,442
[45] May 24, 1977

[54] CODED LABEL AND DECODING MEANS AND METHOD

[75] Inventor: Ralph Sherwill Cass, Mansfield, Canada

[73] Assignee: Ferranti-Packard Limited, Toronto, Canada

[22] Filed: Feb. 2, 1976

[21] Appl. No.: 654,067

[30] Foreign Application Priority Data

Feb. 19, 1975 Canada ................................ 220610

[52] U.S. Cl. .......................... 250/568; 235/61.11 E
[51] Int. Cl.$^2$ ......................................... G06K 7/10
[58] Field of Search ................... 250/555, 566, 568; 235/61.11 E

[56] References Cited

UNITED STATES PATENTS

| | | | |
|---|---|---|---|
| 3,467,819 | 9/1969 | Jorgensen | 235/61.11 E |
| 3,502,851 | 3/1970 | Kakimoto et al. | 235/61.11 E |
| 3,562,494 | 2/1971 | Schmidt | 250/568 |
| 3,586,833 | 6/1971 | Schafer | 235/61.11 E |
| 3,609,306 | 9/1971 | Langley | 250/568 |
| 3,663,803 | 5/1972 | Mohan et al. | 235/61.11 E |

*Primary Examiner*—David C. Nelms

[57] ABSTRACT

Clocking pulses are provided by providing a number of equally spaced potential mark locations serially disposed in the intended direction of relative movement of the marks past a detection location wherein there are provided marks contrasting with the background at every *n*th one of the potential mark locations and where marks are selectively provided or not at the other potential mark locations to provide information. Means are provided for detecting such marks or the absence thereof when the locations are moved relatively to said detecting means, in a relative direction to move serially therepast. At least *n* detectors are provided to disposed in said relative movement disposed so that all sense the status of a location simultaneously and at least one is sensing a mark at one of the '*n*th' locations. By combining the outputs of the detectors at an 'OR' gate a clock signal is produced every time a location passes a detector which clock signal may be used to synchronize the detection of information at the "other" locations.

9 Claims, 6 Drawing Figures

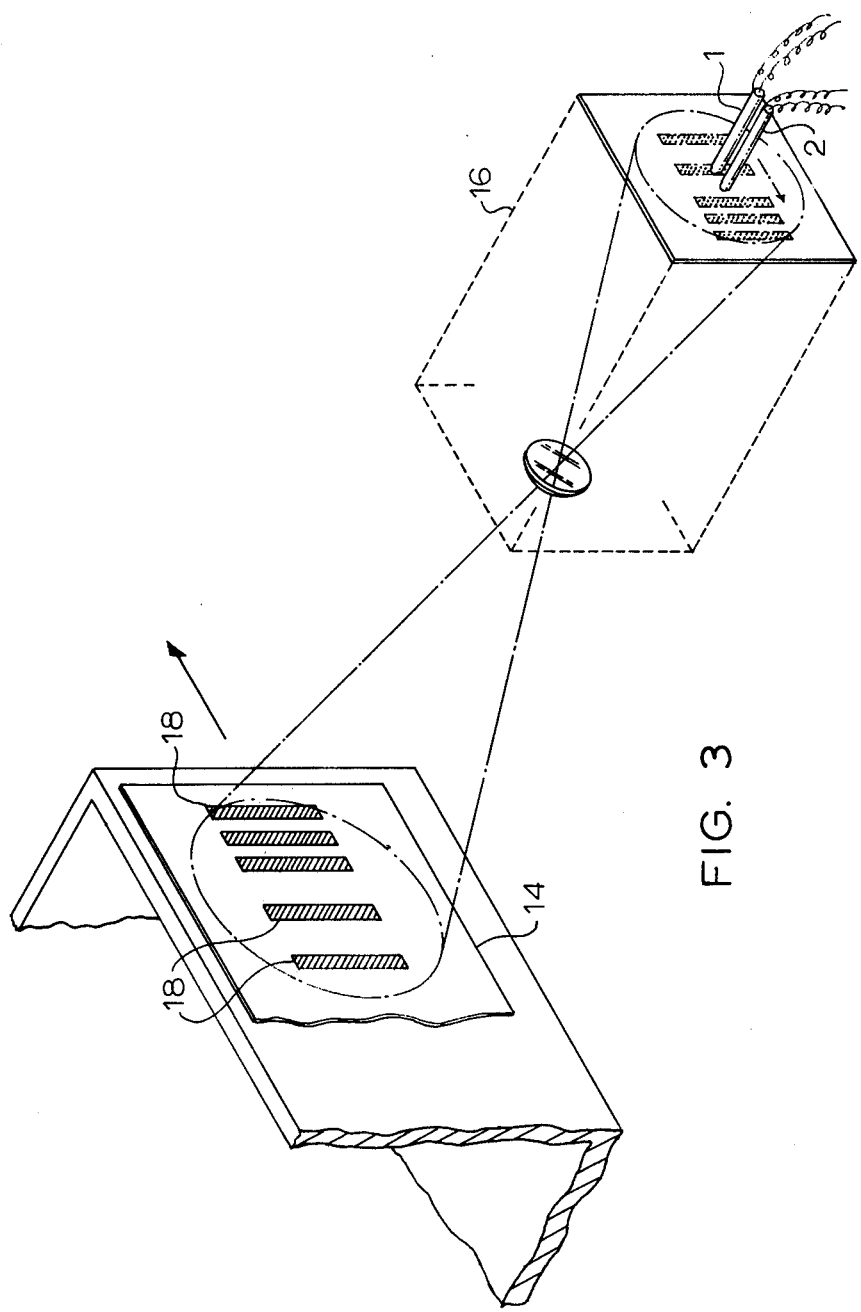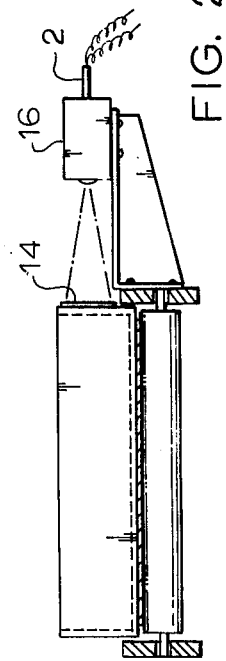
FIG. 3
FIG. 2

CODED LABEL AND DECODING MEANS AND METHOD

The invention includes the provision of a coding system wherein there is disposed on a surface a series of equally spaced locations where marks (or other physically detectable means) may be present or not. At every $n$th one of said locations there are provided a first series of marks which are equally spaced from each other. In the preferred form of the invention a mark of said first series is placed at every second location.

Such first series of marks are used for synchronization or for clocking. The remaining set of locations is used to convey information by the presence or absence of a mark (or other physically detectable means). The marks used for conveying information will be designed to be detectable by the same means and will customarily be identical in form to marks of the first series. In fact in a common application of the invention, both the first series or 'clock marks' and the 'information' marks are the marks made by a bar printer. The surface on which the marks are located can be a label or card on a package or basket travelling on a conveyance or transportation means passing a detection means and with the marks arranged on the surface so that the line of the clocking or information means serially passes a detection means. Alternatively the labelled basket or package may be stationary and manually scanned in a direction so that the mark positions are encountered serially by the detection means.

Where a first series or 'clocking' of marks is alternated with locations where information marks may be present or not then two detectors are used disposed so that when one is detecting a clock mark, the other is detecting at a potential information location and vice versa. These detectors need not be detecting adjacent mark positions (which will be difficult if the closeness of the mark positions makes juxtaposition of the detectors physically difficult). However it will be obvious that they must be off set by an odd number of potential mark locations. Also sufficient extra 'clock' or first series marks must be provided to take into account of the off set of the detectors and ensure that whenever a potential information mark confronts one detector, a clock mark substantially simultaneously confronts the other detector.

Where a clock mark appears at every $n$th position (say every fourth) three information positions will occur between each clock mark equally spaced from each other and the same spacing will occur between a clock mark and the adjacent information position. A number '$n$' of detectors will be required (four in this example). The detectors may be designed and located to substantially simultaneously detect at four consecutive mark locations on the surface. If the detectors are more widely spaced from one another they must be arranged so that when a clock mark is being detected at one location the other detectors are each arranged to detect marks at different positions in the cycle of marks comprising a clock position and the information mark positions between that position and the next clock position. Thus with one of the four detectors opposite a clock position the other three detectors must be arranged so that they are detecting cyclical positions one two and three places removed respectively from a clock position although not necessarily in the same cycle. Here again sufficient extra 'clock' or first series marks must be provided to take into account the offset of the detectors and ensure that whenever a potential information mark confronts one detector, a clock mark substantially simultaneously will be detected by another detector.

In accord with the invention the detection by the two or more detectors is performed and the results are provided to logic means which provides an output when a mark is detected by one or more of the detectors. In this way, whatever the speed of the surface relative to the detection means, a first signal is produced having the frequency with which potential mark and clock locations pass a detection position. From such signal, there may be produced, a second signal of $1/n$ the frequency of the first signal, that is, a signal having the frequency of occurrence of the clock locations. Using either or both of these signals as the basis of clocking or synchronization control, it is easy to detect the information regardless of the relative speed between the surface and the detection means at any given time and regardless of changes in such speed.

Figure 4:
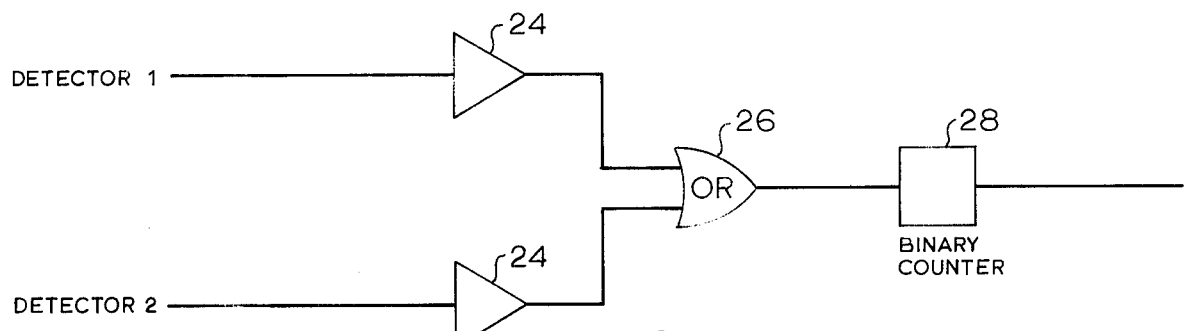
Figure 5:
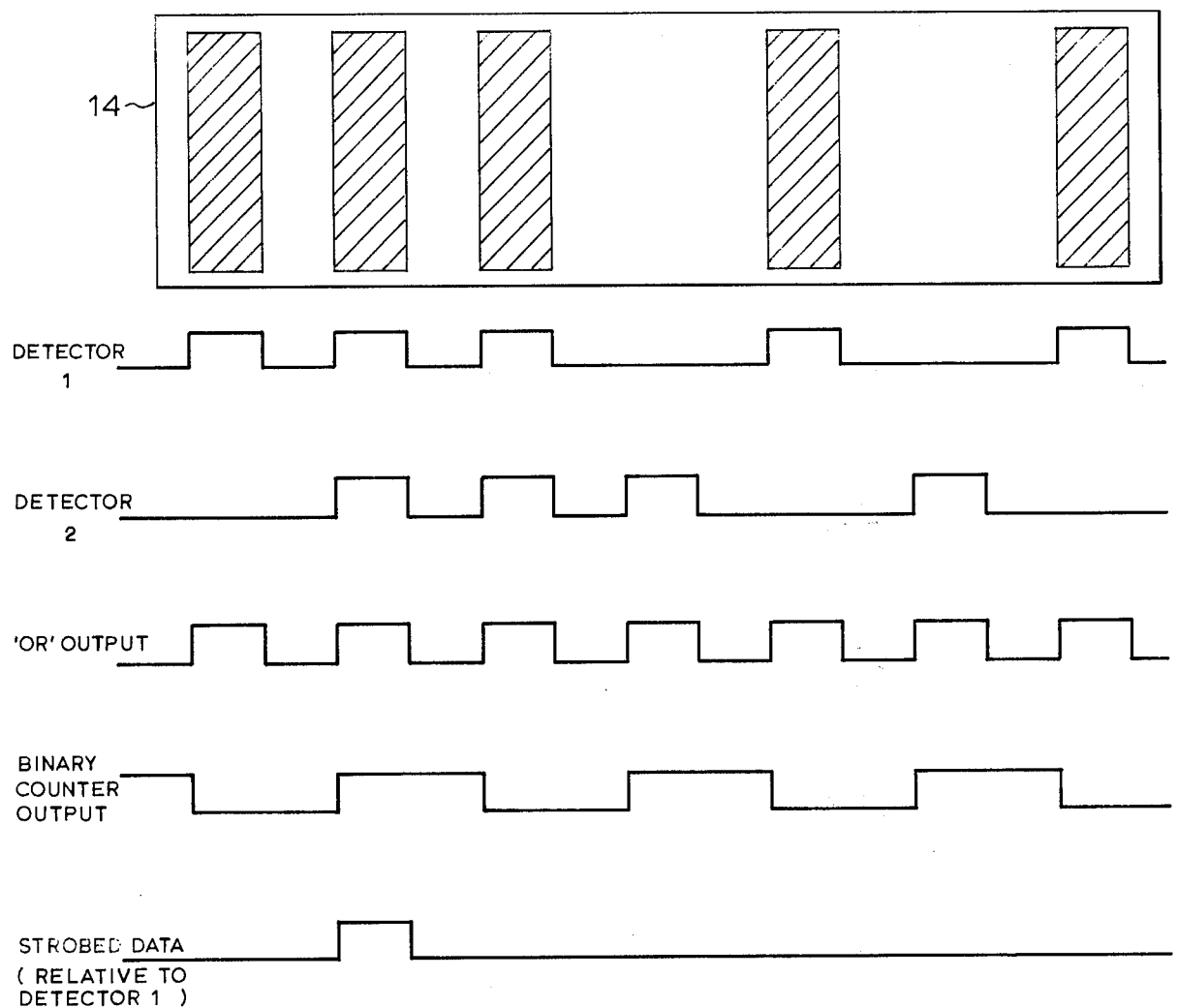
Figure 6:
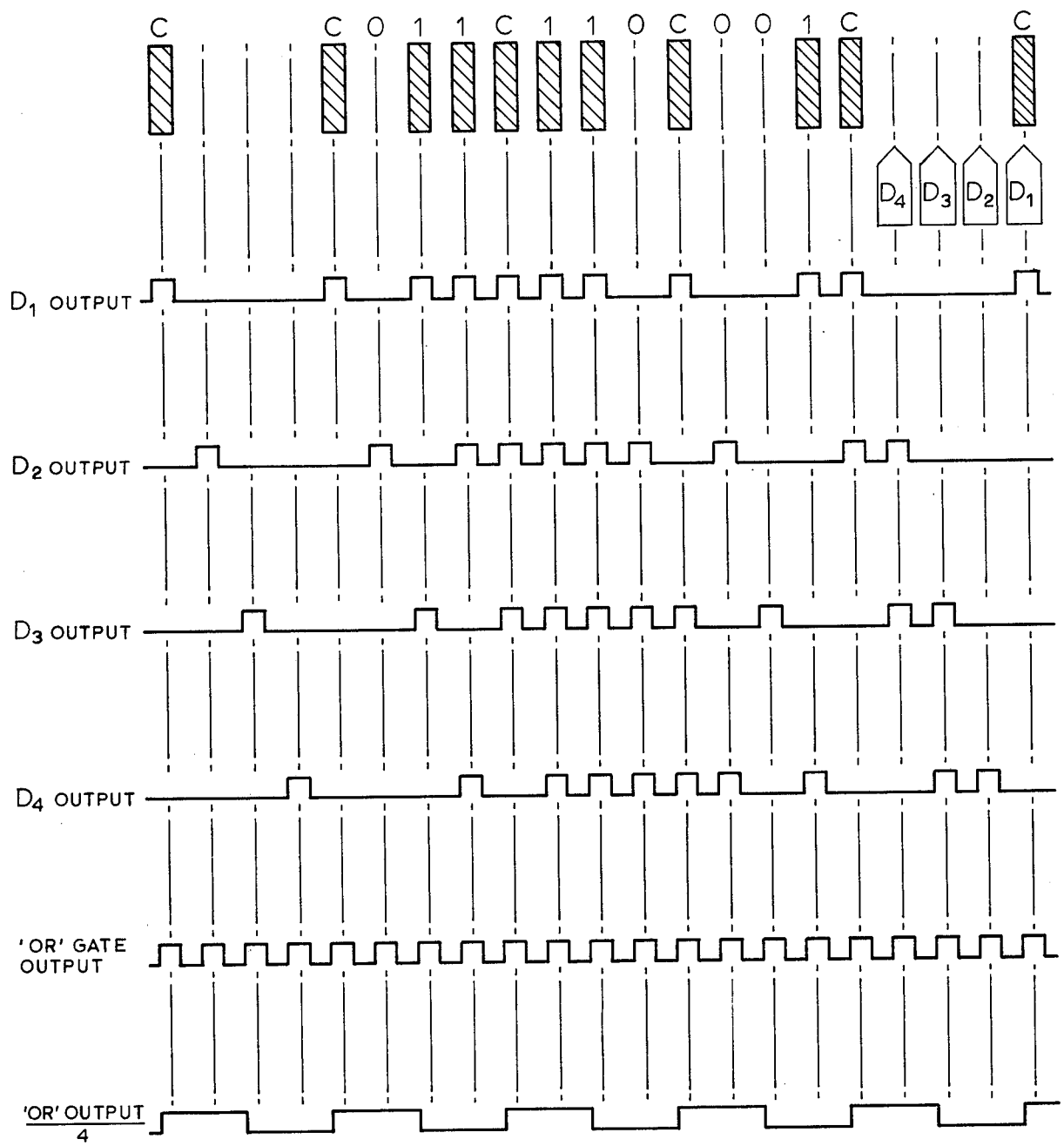

In the drawings:

FIG. 1 shows a perspective showing the general arrangement of the conveyor, the coded surfaces, and the detection means, FIG. 2 shows a cross-section of the conveyor, FIG. 3 shows a schematic indicating the arrangement of the detection means relative to the optical system, FIG. 4 shows a logic diagram, FIG. 5 shows graphs of the output of the logic circuit, and FIG. 6 shows an alternate arrangement to that of FIGS. 1 – 5.

In FIG. 1 there is shown a conveyor 10 which has a number of material carrying trays 12, travelling theredown. In the trays material is carried and the trays are each provided with a coded surface 14, as discussed, the surfaces 14 being located at an approximately uniform height relative to the conveyor, the coded surface being arranged to have regularly spaced locations as shown serially disposed along a line extending in the relative travel direction of the trays relative to a detection means 16. Although any number of locations may be provided, the surfaces shown have seven such locations serially displaced along a line. Bars 18 of a colour contrasting with the back-ground and extending transverse to the line and the intended travel direction are provided at alternate locations, here the 1st, 3rd, 5th and 7th locations. The remaining locations represent the areas where information is represented by the provision or not of a similarly shaped bar to convey information in accord with a binary code.

Thus on the forward tray surface code marks are shown (reading from right to left on the label and from left to right on the image of FIG. 2) there are no marks at positions 4 and 6 and a mark at position 2, conveying the information 100 in binary code. It will be noted that the second tray carries the information 101.

(It is noted that it is not necessary that the information and the clocking marks be of identical form but it would be obvious that one of the advantages of the invention is that with identical form of marks the clocking signal may be obtained and the information be detected without the necessity of distinguishing between the information and clocking bars), and with simple logic and detection means.

At a predetermined location in the intended path of the surface along the conveyor, there are located a pair of detectors 1 and 2, preferably photo cells, with an optical system shown schematically only, focussed to cause the detection of the presence or absence or marks at locations on the line spaced at the distance between adjacent locations. In FIG. 3 the image is presenting position 5 to detector 1 and position 4 to detector 2.

As shown in FIG. 4 the outputs of the cells 1 and 2 preferably amplified at amplifiers 24 are provided to the inputs of an 'OR' gate 26 whose output is connected to a binary counter 28, the output of the binary counter 28 is shown in FIG. 5 along with the means or line it is arrived at. Looking at the card of FIG. 1 or 3 it is seen that there are shown four clocking positions with 3 intervening information positions and that these are each equally spaced from each other along the travel direction.

FIG. 5 shows the signal arising from detection by the detector 1 of marks at all positions but 4 and 6 and the second detector signal detects a signal of similar form to that detected by detector 1 but trailing by a time equal to the time for the surface to move one location position relative to the detectors. From an examination of the graphs of the outputs of detectors 1 and 2 it will be obvious that the OR gate will provide an output signal for each potentially marked position on the surface. It will also be obvious that the 'OR' output signal may be used as the basis of a clock or synchronization signal. Preferably the 'OR' output signal will be converted into a signal of one half the frequency, i.e. of the same frequency as the information marks. Thus the output of the OR gate is fed to the input of the binary counter whose output is shown as the fourth line of the graph. With such signal it is possible to provide a synchronization or clock signal at the frequency of the information marks. The fifth line 'STROBED DATA ' of the graph shows the results of electronically strobing the positive cycles during the positive cycles of the binary counter output. The result is the signal 100.

However once the clock pulse of the 'OR' output of FIG. 5 or the Binary Counter output of FIG. 5 are developed there are no limits to the variety of detection means which may be used and the invention is not intended to be limited in this regard. In each case, it will be noted, the 'OR' output or the binary counter output will reflect changes in the speed of the marked surface relative to the detector and hence detections may be made derived from such signals substantially independent of the relative speed.

FIG. 5 shows the outputs regularly spaced, that is, implying a regular velocity of the label past a detector. However it will be obvious that the detector of the information by the means shown may equally be performed with velocities varying during the detection process.

It would be obvious that since a single line of clocking and information is provided, that considerable tolerance in the orientation and location of the surfaces relative to the detection means, is permitted, since the single row of bars may be extended as far as desired transversely to the direction of travel and the detection means will operate on any part of this extent.

Although the embodiment uses marks optically contrasting with a background, optical focusing and optical detection means, it will be obvious that the principle of the invention will operate with locations marked by other physically detectable means. These would include serially disposed selectively magnetised areas on tape detected by magnetic detectors suitable to a binary type of coding and arranged so that the magnetized areas successively pass each of the detectors operating with logic as described and arranged to detect at spaced locations as with the optical alternatives.

FIG. 6 schematically shows the operation of a circuit where a higher information content relative to the clock marks is desired. Whereas in the embodiment of FIGS. 1 – 5 slightly less than half of the mark position convey information; in the embodiment of FIG. 6 almost ¾ of the mark position convey information.

FIG. 6 schematically illustrates on the top line a surface where every fourth position is a 'clock' or first series mark and the information marks (all mark positions being equally spaced from the adjacent ones) carry the information, as indicated 011, 110, 001. An extra clock mark is provided at each end of the extent of information to ensure that a clock pulse will be provided when an information position is being examined.

Four detectors D1, D2, D3, and D4 are located to detect at four adjacent mark positions as the marks move therepast. The output signals derived from these detections are show below the surface and it will be seen that the output of each detector lags the preceeding one by one step.

It will be obvious that when the outputs of the four detectors are applied to an "OR" gate, the output signal (sixth line in FIG. 6) will be a signal having a pulse for each passage of a given detectors by a location. This clock pulse may be used for detection or may be devided by four or otherwise handled to produce a clock pulse having the frequency with which clock marks pass a given position. The frequency of either of these clock signals will vary as the speed of the surface past the detectors and either may be used as a basis for detection of the information.

I claim:

1. Method of providing clocking pulses for use in the detection of information on a surface wherein a predetermined number of potential mark locations are disposed serially and spaced at equal intervals from each other, such serial disposition being arranged to extend in the intended direction of relative movement of said marks past a detecting means, wherein there are provided a first series of marks which may be differentiated by detecting means from the surrounding area on said surface at regularly spaced ones of said potential mark locations, and providing at selected ones of the remaining mark locations marks detectable by said detection means;

whereby the location of a mark of said first series and the potential mark locations spacing such mark from the next mark of said series form a cyclical series, substantially simultaneously detecting the presence or absence of marks, at a number of detection locations, spaced serially along the relative path of the potential mark locations, the number of detector locations corresponding to the number of potential mark locations in a cyclical series, said detector locations being arranged so that simultaneous detections are made of potential mark locations each of which has a different position in such a cyclical series, deriving from said substantially simultaneous detections a signal each time a mark is detected at any one of said detector locations, whereby such signals appear at a rate corresponding to that at which said potential mark locations pass a detection means, the extent of said first series of marks being selected so that a mark of said first series is detected by at least one of said detectors at times when a mark may be detected by one of the other detectors.

2. Method of providing clocking pulses for use in the detection of information contained on a surface, wherein a predetermined number of potential mark locations are disposed serially and substantially equally spaced from each other, said serially disposition being designed to extend in the intended direction of relative movement of said marks past a detection locations wherein there are provided marks contrasting with said background at every $n$th one of said potential mark locations, and at a number of the remaining potential mark locations having a mark present or not in order to convey information, said marks being physically detectable, detecting at '$n$' spaced locations along said relative path the presence or absence of a mark, wherein said locations are chosen so that when one of said detection locations corresponds to a mark at an $n$th one of said potential mark locations the other detector locations each correspond to a potential mark location of a different spacing from marks at an $n$th one of said potential mark locations, as a result of said detection, providing a signal at any time that a mark is detected at at least one of said detection locations, the extent of said marks at every $n$th of said potential mark locations being selected so that a mark at such $n$th one of said potential mark locations is detected at one of said detectors at times when a mark at a potential mark location would be detected by one of the other detectors.

3. A method as claimed in claim 1 wherein said detector locations are arranged so that simultaneous detections are made of consecutive potential mark locations.

4. A method as claimed in claim 2 wherein said '$n$' spaced locations correspond to $n$ consecutive potential mark locations.

5. Means for providing clocking pulses for use in the detection of information on a surface wherein a predetermined number of potential physically detectable locations are disposed serially and substantially equally spaced from each other, such serial disposition being arranged to extend in the intended direction of relative movement and said locations past a detecting means, wherein there are provided means detectable physically relative to said background at alternate ones of said locations, and at the remaining ones of said locations, having a means physically detectable present or not, in order to convey information, means for detecting said physically detectable means, said means comprising a pair of detection means designed and arranged, during movement of said detectable means relative thereto along a relative path defined by said serial disposition, to substantially simultaneously detect the presence or absence of physically detectable means at sequential potential sensible locations, means for providing a signal each time a physically detectable location is detected by one or by both detection means, whereby the signal is an indication of the passage of a potential sensing location relative to said detection means.

6. Means for providing clocking pulses for use in the detection of information on a surface wherein a predetermined number of potential physically detectable locations are disposed serially, such serial disposition being arranged to extend in the intended direction of relative movement of said marks past a detecting means, wherein there are at alternative ones of said physically detectable locations, provided means detectable physically relative to said background, and at the remaining potential physically detectable locations, having a means detectable physically selectively present or not, in order to convey information, means for detecting said physically detectable means, said means comprising a pair of detecting means, designed and arranged during movement of said detectable means relative thereto along a relative path defined by said serial disposition, to substantially simultaneously detect the presence or absence of physically detectable means at sequential potential physically detectable locations, means for providing a signal each time a physically detectable means is detected by one or by both detection means, whereby the signal is an indication of the passing of a potential sensing location relative to said detection means.

7. Means for providing clocking pulses for use in the detection of information contained on a surface, wherein a predetermined number of potential mark locations are disposed serially and substantially equally spaced from each other, said serial disposition being designed to extend in the intended direction of relative movement of said marks past a detection location, wherein there are provided marks contrasting with said background at every $n$th one of said potential mark locations and a number of the remaining potential mark locations having a mark present or not in order to convey information, and wherein said marks are constituted to be physically detectable, comprising in combination, providing $n$ detectors spaced along said relative path, each of said detectors being selected to detect the presence of a mark, the said detectors being located so that when one of said detectors detects a mark at an $n$th one of said potential mark locations, the other detectors are arranged to detect at locations having a different spacing from marks at an $n$th one of said potential mark locations.

8. Means for producing a clock pulse using an information bearing surface provided with a first plurality of locations physically detectable relative to a background, said locations being substantially regularly spaced in a line, a second plurality of potential information locations midway between adjacent pairs of locations from said first plurality, at least some of said second plurality of locations being treated to be physically detectable by the same means as are said first plurality of locations;

including means for physically detecting substantially simultaneously areas on said surface along said line at the spacing between adjacent first and second locations, and means responsive to said detection means designed to produce a signal whenever a physically sensible location corresponds to either or to both of said areas.

9. Means for producing a clock pulse using an information bearing surface having a plurality of potential mark positions said positions being substantially regularly spaced in a line, physically detectable marks located at every $n$th of said postions and physically detectable marks present or absent at the other positions in accord with information to be conveyed;

including $n$ means for detecting, substantially simultaneously, areas on said surface along said line at the spacing between adjacent first and second locations and means responsive to said detection means, designed to produce a signal whenever a mark is detected at either of said areas. where each detection means is located to detect at a different spacing from one of said $n$th positions.

* * * * *